United States Patent
Jackson et al.

(10) Patent No.: US 10,469,788 B2
(45) Date of Patent: Nov. 5, 2019

(54) METHODS, SYSTEMS, AND MEDIA FOR CAUSING AN ALERT TO BE PRESENTED

(71) Applicant: Google LLC, Mountain View, CA (US)

(72) Inventors: Dean Kenneth Jackson, Pittsburgh, PA (US); Daniel Victor Klein, Pittsburgh, PA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/818,367

(22) Filed: Nov. 20, 2017

(65) Prior Publication Data
US 2018/0077377 A1 Mar. 15, 2018

Related U.S. Application Data

(63) Continuation of application No. 14/584,331, filed on Dec. 29, 2014, now Pat. No. 9,826,188, which is a (Continued)

(51) Int. Cl.
*H04N 5/44* (2011.01)
*H04N 5/445* (2011.01)
(Continued)

(52) U.S. Cl.
CPC ..... *H04N 5/44513* (2013.01); *H04N 5/44543* (2013.01); *H04N 21/44008* (2013.01);
(Continued)

(58) Field of Classification Search
CPC .......... H04N 2005/44556; H04N 2005/44569; H04N 21/4532; H04N 21/454;
(Continued)

(56) References Cited

U.S. PATENT DOCUMENTS

| 5,778,135 A | * | 7/1998 | Ottesen | ............. H04N 7/17318 348/E7.071 |
| 6,351,596 B1 | * | 2/2002 | Ostrover | ............. G11B 27/034 386/241 |

(Continued)

FOREIGN PATENT DOCUMENTS

| CN | 1582576 A | 2/2005 |
| CN | 101099210 A | 1/2008 |

(Continued)

OTHER PUBLICATIONS

International Preliminary Report on Patentability and Written Opinion dated Feb. 3, 2015 in International Patent Application No. PCT/US2013/037843.

(Continued)

*Primary Examiner* — David E Harvey
(74) *Attorney, Agent, or Firm* — Byrne Poh LLP

(57) ABSTRACT

Systems and methods for customizing video include providing a portion of video to an electronic display and identifying a character or personality in the portion of video. A request to perform an action regarding the portion of video may be detected and the action may be associated with the identified character or personality. The action may be performed on a second portion of video in response to the character or personality being identified in the second portion of video.

18 Claims, 5 Drawing Sheets

Related U.S. Application Data continuation of application No. 13/563,523, filed on Jul. 31, 2012, now Pat. No. 8,948,568.

(51) Int. Cl.
  *H04N 21/44* (2011.01)
  *H04N 21/472* (2011.01)
  *H04N 21/475* (2011.01)
  *H04N 21/488* (2011.01)
  *H04N 21/845* (2011.01)
  *H04N 21/442* (2011.01)
  *H04N 21/462* (2011.01)

(52) U.S. Cl.
  CPC ... *H04N 21/44222* (2013.01); *H04N 21/4622* (2013.01); *H04N 21/4755* (2013.01); *H04N 21/47214* (2013.01); *H04N 21/47217* (2013.01); *H04N 21/4882* (2013.01); *H04N 21/8456* (2013.01)

(58) Field of Classification Search
  CPC ......... H04N 21/44008; H04N 21/4755; H04N 21/4882; H04N 21/47214; H04N 21/47217; H04N 21/8456; H04N 21/44222; H04N 21/4622; H04N 5/44513; H04N 5/44543

See application file for complete search history.

(56) References Cited

U.S. PATENT DOCUMENTS

| | | |
|---|---|---|
| 6,557,042 B1 | 4/2003 | He et al. |
| 6,859,803 B2 | 2/2005 | Dagtas et al. |
| 6,928,231 B2 | 8/2005 | Tajima |
| 7,493,014 B2 | 2/2009 | McGrath et al. |
| 7,567,846 B2 | 7/2009 | Sztybel |
| 7,895,624 B1 | 2/2011 | Thomas et al. |
| 8,103,149 B2 | 1/2012 | Kagawa |
| 8,151,292 B2 | 4/2012 | Lee et al. |
| 8,301,664 B2 | 10/2012 | Watanabe et al. |
| 8,307,403 B2 | 11/2012 | Bradstreet et al. |
| 8,417,096 B2 | 4/2013 | Gharaat et al. |
| 8,849,041 B2 | 9/2014 | Neumann |
| 2002/0178440 A1 | 11/2002 | Agnihotri et al. |
| 2003/0040962 A1 | 2/2003 | Lewis |
| 2003/0093580 A1* | 5/2003 | Thomas ............ G06F 17/30787 719/318 |
| 2003/0093790 A1 | 5/2003 | Logan et al. |
| 2005/0086266 A1 | 4/2005 | Kang et al. |
| 2005/0114539 A1 | 5/2005 | Yoon et al. |
| 2006/0184648 A1* | 8/2006 | Ohsumi ............ G06F 17/30867 709/219 |
| 2007/0083887 A1 | 4/2007 | Gutta et al. |
| 2007/0143802 A1 | 6/2007 | Hope et al. |
| 2007/0174869 A1 | 7/2007 | Kim |
| 2007/0248334 A1 | 10/2007 | Murakoshi |
| 2008/0086688 A1 | 4/2008 | Chandratillake et al. |
| 2009/0043725 A1 | 2/2009 | Gutta |
| 2009/0103887 A1 | 4/2009 | Choi et al. |
| 2009/0116815 A1 | 5/2009 | Ryu |
| 2009/0156170 A1 | 6/2009 | Rossano |
| 2009/0182719 A1 | 7/2009 | Chun et al. |
| 2009/0190804 A1 | 7/2009 | Yokoi |
| 2009/0279843 A1 | 11/2009 | Wang et al. |
| 2009/0282093 A1 | 11/2009 | Allard et al. |
| 2009/0327193 A1 | 12/2009 | Eronen et al. |
| 2010/0050202 A1 | 2/2010 | Kandekar et al. |
| 2010/0067750 A1 | 3/2010 | Matsuo et al. |
| 2010/0077435 A1* | 3/2010 | Kandekar ............ G11B 27/005 725/61 |
| 2010/0202753 A1 | 8/2010 | Chun et al. |
| 2010/0318429 A1 | 12/2010 | Birch |
| 2011/0208722 A1 | 8/2011 | Hannuksela |
| 2011/0246560 A1 | 10/2011 | Gibson |
| 2012/0060176 A1 | 3/2012 | Chai et al. |
| 2012/0079004 A1 | 3/2012 | Herman |
| 2012/0140982 A1 | 6/2012 | Sukegawa et al. |
| 2012/0147269 A1 | 6/2012 | Cho et al. |
| 2012/0148217 A1 | 6/2012 | Ellis et al. |
| 2012/0183275 A1 | 7/2012 | Spears |
| 2012/0185891 A1 | 7/2012 | Conradt et al. |
| 2012/0222056 A1 | 8/2012 | Donoghue et al. |
| 2012/0239689 A1 | 9/2012 | Asikainen |
| 2012/0239690 A1* | 9/2012 | Asikainen ......... G06F 17/30038 707/770 |
| 2012/0245982 A1 | 9/2012 | Daniel |
| 2012/0281886 A1 | 11/2012 | He et al. |
| 2013/0124551 A1 | 5/2013 | Foo |
| 2013/0174189 A1 | 7/2013 | Danker et al. |
| 2013/0227013 A1 | 8/2013 | Maskatia et al. |
| 2014/0157307 A1 | 6/2014 | Cox |
| 2015/0110464 A1 | 4/2015 | Jackson et al. |

FOREIGN PATENT DOCUMENTS

| | | |
|---|---|---|
| EP | 1843262 | 10/2007 |
| JP | 2005005795 | 1/2005 |
| JP | 2012-142784 | 7/2012 |
| KR | 2011-0093659 | 8/2011 |
| KR | 2012-0036494 | 4/2012 |
| KR | 2012-0064581 | 6/2012 |
| WO | WO/2003/041410 | 5/2003 |
| WO | WO/2006/073275 | 7/2006 |

OTHER PUBLICATIONS

International Search Report & Written Opinion dated Aug. 23, 2013 in International Patent Application No. PCT/US2013/037837.
International Search Report & Written Opinion dated Aug. 12, 2013 in International Patent Application No. PCT/US2013/037843.
Office Action dated Apr. 20, 2017 in U.S. Appl. No. 14/584,331.
Office Action dated May 14, 2014 in U.S. Appl. No. 13/563,523.
Office Action dated Jun. 5, 2017 in CN Application No. 201380050027.5.
Office Action dated Jun. 10, 2016 in U.S. Appl. No. 14/584,331.
Office Action dated Oct. 8, 2015 in U.S. Appl. No. 14/584,331.
Office Action dated Nov. 19, 2013 in U.S. Appl. No. 13/563,523.
Office Action dated Aug. 29, 2016 in U.S. Appl. No. 12/115,557.
Office Action dated Sep. 22, 2016 in U.S. Appl. No. 14/584,331.
Sipe et al., "Final Report: Face Mining of Digital Video", Technical Report, Program Review TTC Round # 18, PittPatt, Nov. 19, 2010, pp. 1-3.
Supplementary European Search Report dated Jan. 29, 2016 in European Patent Application No. 13825296.0.
Wikipedia, "Clear Play", pp. 1-3, available at: http://en.wikipedia.org/wiki/ClearPlay/, last accessed May 4, 2013.
Notice of Allowance dated Jul. 19, 2017 in U.S. Appl. No. 14/584,331.
Notice of Allowance dated Sep. 26, 2014 in U.S. Appl. No. 13/563,523.
Office Action dated Sep. 27, 2013 in U.S. Appl. No. 13/563,543.
Office Action dated Jan. 24, 2019 in KR Patent Application No. 10-2015-7004641.

* cited by examiner

METHODS, SYSTEMS, AND MEDIA FOR CAUSING AN ALERT TO BE PRESENTED

CROSS-REFERENCE TO RELATED APPLICATIONS

This application is a continuation of U.S. patent application Ser. No. 14/584,331, filed Dec. 29, 2014, which is a continuation of U.S. patent application Ser. No. 13/563,523, filed Jul. 31, 2012, each of which is hereby incorporated by reference herein in its entirety.

BACKGROUND

The present disclosure relates generally to providing video to an electronic display. The present disclosure more specifically relates to customizing the video based on a recognized character or personality in the video.

A video may be available in any number of different formats. For example, a video may be available via a television channel, as a video stream, as an Internet download, or on a storage medium (e.g., a DVD, a Blu-Ray disc, a VHS tape, etc.). Different devices may be used to present the video on a display, depending on the format of the video. For example, a computer may present a streamed video on a display and a DVD player may present a DVD movie to a television set.

In many cases, a video may be presented to a viewer in a take-it-or-leave-it manner. For example, a viewer of a television program may have the option of changing the channel or turning off the television, but have no control over the actual content of the television program itself. Similarly, a viewer of a DVD movie may have the option of skipping the current scene or fast-forward through the scene, but have no control over the scene itself.

SUMMARY

Implementations of the systems and methods for customizing video are disclosed. One implementation is a method for customizing video that includes providing, by a processing circuit, a portion of video to an electronic display. The method also includes identifying, by the processing circuit, a character or personality in the portion of video. The method further includes detecting, by the processing circuit, a request to perform an action regarding the portion of video. The method yet further includes associating, by the processing circuit, the identified character or personality in the portion of video with the action based in part on the detected request. The method additionally includes identifying, by the processing circuit, the character or personality in a second portion of video. The method also includes performing the action regarding the second portion of video in response to identifying the character or personality in the second portion of video.

Another implementation is a system for customizing video. The system includes a processing circuit operable to provide a portion of video to an electronic display and to identify a character or personality in the portion of video. The processing circuit is also operable to detect a request to perform an action regarding the portion of video and to associate the identified character or personality in the portion of video with the action based in part on the detected request. The processing circuit is further operable to identify the character or personality in a second portion of video and to perform the action regarding the second portion of video in response to identifying the character or personality in the second portion of video.

A further implementation is a computer-readable storage medium having instructions therein, the instructions being executable by one or more processors to perform operations. The operations include providing a portion of video to an electronic display and identifying a character or personality in the portion of video. The operations also include detecting a request to perform an action regarding the portion of video and associating the identified character or personality in the portion of video with the action based in part on the detected request. The operations further include identifying the character or personality in a second portion of video and performing the action regarding the second portion of video in response to identifying the character or personality in the second portion of video.

These implementations are mentioned not to limit or define the scope of this disclosure, but to provide examples of implementations to aid in understanding thereof. Particular implementations can be developed to realize one or more of the following advantages.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims.

DETAILED DESCRIPTION

Figure 1:
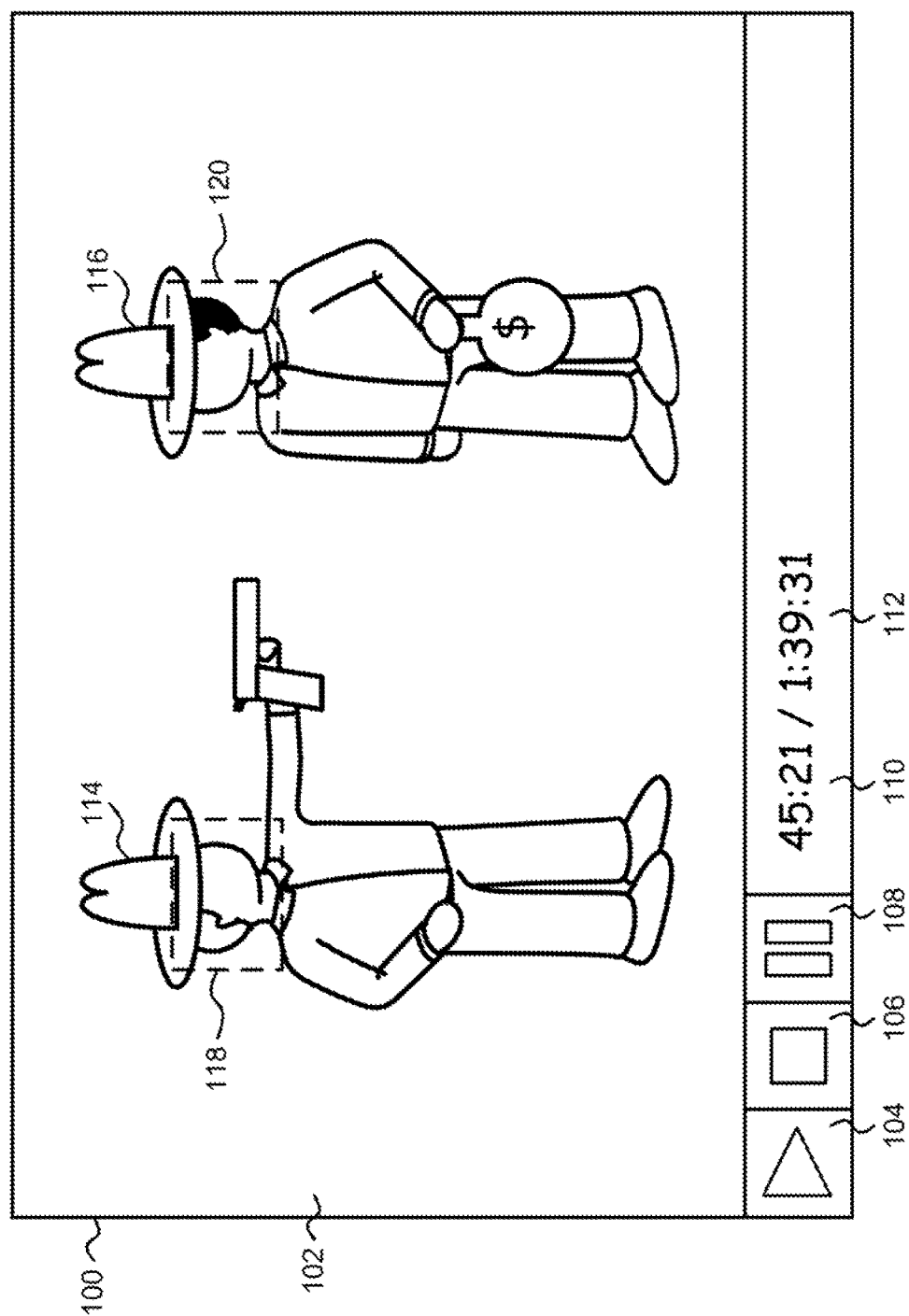
FIG. 1 is an example illustration of a video being provided to an electronic display.

According to some aspects of the present disclosure, a video customization service may be configured to customize how video is presented to a viewer. Generally, a viewer may have different dispositions towards the characters or personalities in a video. For example, a viewer may like a particular movie, but absolutely hate a particular character in it. In such a case, the view's overall impression of the video may be diminished because of the hated character. Conversely, a viewer may have a negative impression of a television show, but love a particular character. In various implementations, a video customization service may be used to emphasize certain portions of a video and deemphasize other portions based on whether a portion contains a loved or hated character or personality.

In various implementations, a video customization service may use image recognition to detect the presence of a character or personality within a video. In general, a personality may be any being that exists in the real world (e.g., actor, celebrity, person, animal, etc.). In contrast, a character may be any being that exists within a video. A character may or may not have a corresponding personality. For example, a character may be played by an actor or may be artificially created (e.g., a cartoon character, an animated character, etc.). Based in part on a viewer's preferences regarding the character or personality, the video customization service may alter how the video is presented to the viewer. For example, the video customization service may skip over portions of the video that contain the character or personality, skip to portions of the video that contain the character or personality, fast forward through scenes that contain the character or personality, mute the audio associated with the character or personality, or perform other such actions.

A viewer's preferences regarding a particular character or personality may be specified manually or detected automatically by the video customization service. For example, a viewer may manually select how the video customization service is to handle the detection of the character or personality. In some implementations, the video customization service may analyze how the viewer interacts with video containing the character or personality. Based on the analysis, the video customization service may identify one or more actions to be performed when the character or personality is detected in a video. An identified action may then be provided by the video customization service to the viewer as a suggested preference regarding the character or personality. In other cases, the video customization service may use the identified actions to set preferences for the viewer automatically (e.g., without receiving a further request from the viewer to do so).

In some implementations, the video customization service may monitor or analyze video from an undisplayed source to identify a particular character or personality. For example, the video customization service may monitor television channels or streamed video channels that are not currently being provided to a display, to identify a particular character or personality. Based on a user's preferences, the video customization service may provide an alert to the user that the character or personality is being shown in an undisplayed portion of video (e.g., video on an undisplayed channel, another scene in a playing movie, etc.). For example, the video customization service may provide an on-screen alert, an audio alert, an alert to a mobile device of the user, or other such alert, to notify the user when a particular character or personality is featured in an available video.

Referring now to FIG. 1, an example illustration of a video being provided to an electronic display 100 is shown, according to various implementations. Electronic display 100 may be in communication with one or more processors of a video customization service that provide video data to electronic display 100. According to various implementations, electronic display 100 may share the same housing as the one or more processors. For example, electronic display 100 may be a display of a laptop computer, a mobile device, or a "smart" television (e.g., a television that incorporates features of a computer, such as an operating system). In other implementations, electronic display 100 may receive the video data from a separate device in electronic communication with electronic display 100. For example, electronic display 100 may be a television set or monitor in communication with a computer, media player, gaming console, set-top box, or similar electronic device configured to provide video data to electronic display 100.

As shown, a video 102 may be provided to electronic display 100 and displayed. In some implementations, video 102 may be a pre-stored video. For example, video 102 may be stored on a DVD disc, a Blu-Ray disc, a hard drive, a flash drive, or another electronic storage medium. In further implementations, video 102 may be received from a remote source. For example, video 102 may be received via a video stream, a television channel, a cable channel, a satellite channel, or a similar source. In either case, some or all of video 102 may be buffered prior to presentation on electronic display 100. In other words, a portion of video 102 may be downloaded and stored in a buffer memory prior to being presented on electronic display 100.

Various user controls may be associated with video 102. In some implementations, some or all of the controls associated with video 102 may be presented on electronic display 100, such as icons 104-108. Icons 104-108 may be selected by a viewer via operation of an interface device, such as a keyboard, mouse, remote control, or other pointing device. For example, video 102 may be paused via selection of icon 108 or stopped via selection of icon 106. Similarly, video 102 may be started or resumed via selection of icon 104. In other implementations, some or all of the functions of icons 104-108 may be integrated into an interface device. For example, a remote control may have specific buttons to pause, play, and stop video 102. Other exemplary user controls may be used to request that an action be performed, such as changing a channel, changing a video source (e.g., to change from a television channel to a DVD player), returning to a title menu, adjusting or muting the volume of video 102, specifying a language setting, viewing the remaining time of video 102, displaying a channel guide, displaying information regarding video 102 (e.g., its title, year, etc.), skipping to another scene, fast forwarding video 102, rewinding video 102, playing video 102 in slow motion, or performing other such functions.

Information regarding video 102 may be provided to electronic display 100. In some cases, the current running time 110 and total running time 112 of video 102 may be displayed on electronic display 100. For example, video 102 may be at current running time 45:21/1:39:31 signifying that video 102 is at the forty five minute and twenty one second mark. Related information, such as the time remaining (e.g., 54:10) may also be provided to electronic display 100. Additional information regarding video 102 may include, but is not limited to, the current chapter, the current scene, the title of video 102, the year video 102 was recorded, and one or more characters or personalities in video 102.

According to various implementations, the video customization service may use image recognition on video 102 to identify one or more characters or personalities in video 102. In general, a personality may be a real-world actor, celebrity, newscaster, or other being appearing in video 102 (e.g., a person, an animal, etc.). A character, in contrast, may be specific to video 102 or a set of related videos (e.g., a set of movies, episodes of a television show, etc.) played by the personality (e.g., a part played by an actor). In some cases, video 102 may include an artificially-generated character. For example, a character may be artificially created in video 102 using computer generated imagery (CGI) technology. Thus, a character may or may not have a corresponding personality in the real world, but still be recognizable by the customization service via image recognition.

Image recognition may be performed on the current image of video 102 provided to electronic display 100 (e.g., as video 102 is being played). For example, assume that the current image of video 102 includes two characters: a first character 114 and a second character 116. In some implementations, the video customization service may identify characters 114, 116 by analyzing their respective facial regions 118, 120 (e.g., using facial recognition). Similarly, facial regions 118, 120 may be analyzed using image recognition to identify any real-world personalities associated with characters 114, 116. For example, the actor playing character 114 may be identified by using facial recognition on facial region 118 in video 102.

In further implementations, the video customization service may use image recognition on images of videos that are not currently being provided to electronic display 100. For example, the video customization service may perform image analysis on an undisplayed channel or other portions of video 102. In some implementations, portions of video 102 may be stored in a buffer of the customization service and analyzed using image recognition, prior to being provided to electronic display 100. For example, image recognition may be performed on any number of undisplayed scenes of video 102 (e.g., the next scene to be displayed if video 102 is played normally, etc.) and/or ranges of play time of video 102 (e.g., the next ten minutes of video 102, etc.).

Figure 2:
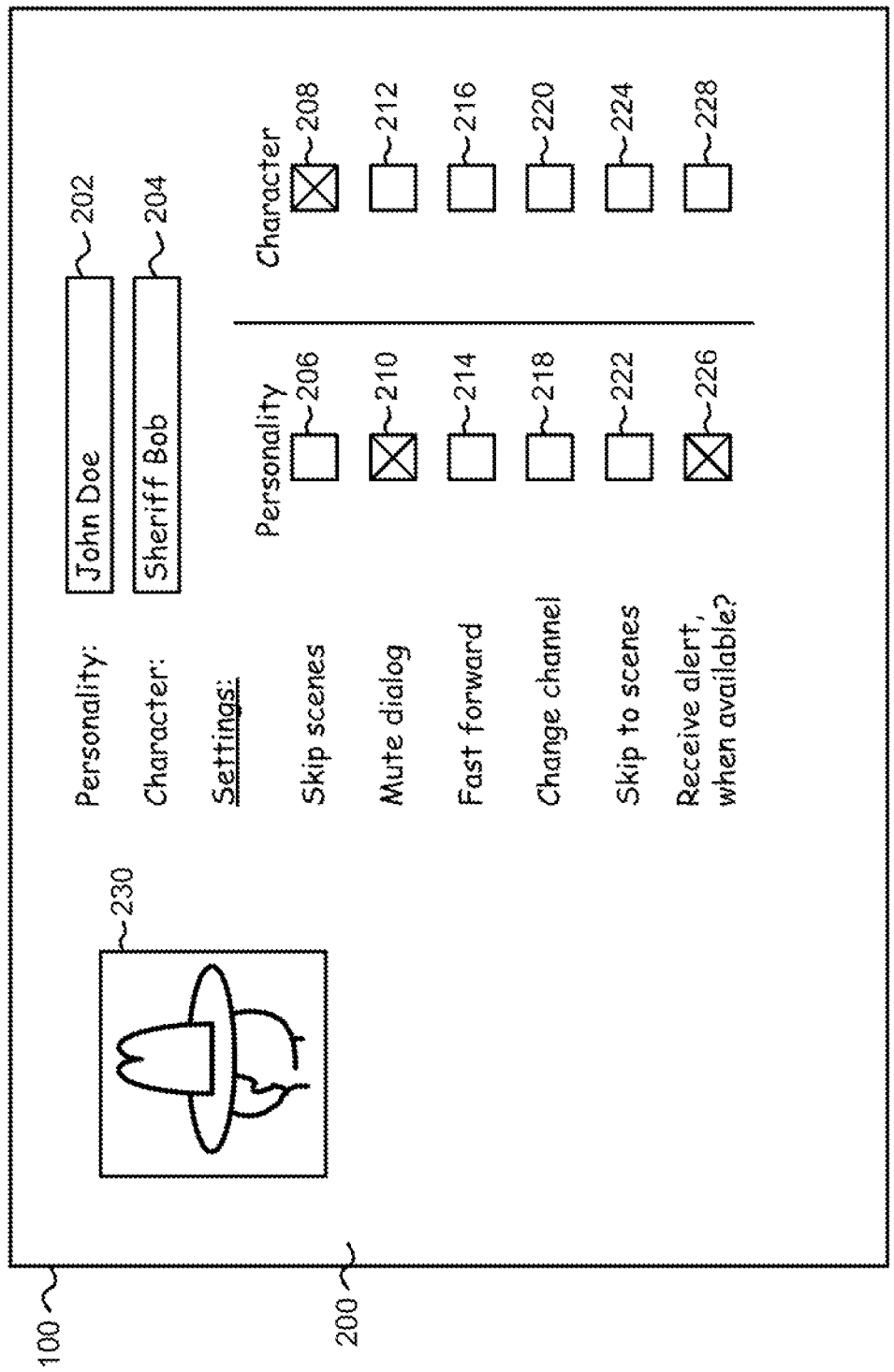
FIG. 2 is an example illustration of a preferences screen for a video customization service.

Referring now to FIG. 2, an example illustration of a preferences screen 200 for a video customization service is shown, according to various implementations. As shown, preferences screen 200 may be provided by the video customization service to an electronic display, such as electronic display 100. In some implementations, preferences screen 200 may be presented in response to receiving a request from a user interface device, such as a remote control or a touch-screen display.

Preferences screen 200 may be associated with a particular character and/or personality. In some implementations, the character and/or personality may be associated with a character or personality identified within a playing video. In the example shown, preferences screen 200 may be associated with character 114 identified within video 102 in FIG. 1. For example, a user may operate a user interface device when video 102 is being displayed to enter a preferences screen relating to character 114. In other implementations, a user may first search for the character or personality via the video customization service. For example, a user may search for a particular title, release date, character's name, personality's name, studio, or genre via the video customization service. The user may then select one or more of the results to enter preferences regarding a particular character or personality. In some implementations, preferences screen 200 may be associated with a set of different characters or personalities. For example, preferences screen 200 may be associated with a set of actors in a particular TV show or movie.

Preferences screen 200 may include various indicia regarding its associated character, personality, or set of characters or personalities. As shown, preferences screen 200 may include a name 204 of the associated character and/or a name 202 of the personality that plays the character. For example, character 114 in video 102 may be named "Sheriff Bob," as indicated by name 204. Similarly, "Sheriff Bob" may be played by "John Doe," as indicated by name 202 on preferences screen 200. In some implementations, preferences screen 200 may include one or more images of its associated character or personality. For example, preferences screen 200 may include an image 230 of the character, "Sheriff Bob."

According to various implementations, preferences screen 200 may be configured to allow a user to set preferences in the video customization service for an associated character and/or personality. Preferences may be set via preferences screen 200 for a particular user profile or a particular device. For example, a user may log into his or her profile of the video customization service, to access preferences screen 200. In another example, preferences screen 200 may be used to set preferences for a particular device, such as a television set or set-top box. The preferences set via preferences screen 200 may be applied to a character and personality individually or collectively, in various implementations. For example, preferences screen 200 may allow different preferences to be set for the character Sheriff Bob than for John Doe, the personality that plays Sheriff Bob.

Preferences for the video customization service may be set on preferences screen 200 via selection of inputs 206-228. Inputs 206-228 may include radial buttons, check boxes, text fields, buttons, or any other form of graphical input mechanism. Preferences set via inputs 206-228 may be used by the video customization service to control how video containing the character or personality is presented. Thus, preferences screen 200 may be used to control how the service customizes video to be presented to an electronic display. In general, the video customization service may use image recognition to determine whether the character or personality associated with preferences screen 200 is present in a portion of a video. If the character or personality is present, the video customization service may perform a customization action specified via inputs 206-228.

In some cases, customization actions performed by the video customization service may be mutually-exclusive. In such cases, selection of some or all of inputs 206-228 may also be mutually-exclusive. For example, only one of inputs 206-214 may be selected regarding the personality, John Doe, if their associated actions are mutually-exclusive (e.g., selection of input 206 may cause input 208 to be unselected).

Input 206 may be configured to control whether the video customization service is to skip scenes that contain the personality. For example, a user may select input 206 if he or she never wishes to see the personality John Doe. Similarly, input 216 may be configured to control whether the video customization service is to skip scenes that contain the personality, Sheriff Bob. For example, a user may have a positive or neutral impression of John Doe, but absolutely hate the character, Sheriff Bob. In various implementations, the video customization service may use image recognition on a buffered portion of a video to determine whether the portion contains the character or actor. If so, the buffered portion of the video may be skipped (e.g., not provided to an electronic display), if either of inputs 206, 216 is selected.

Input 208 may be configured to control whether the video customization service is to mute dialog for the personality associated with preferences screen 200 (e.g., video containing the personality may still be presented to an electronic display, but its audio may be muted). Similarly, input 218 may be configured to control whether the character's dialog is to be muted. In some implementations, the video customization service may mute the audio of any portion of a video in which the personality or character is identified. For example, the video customization service may mute any scenes that contain John Doe or Sheriff Bob, respectively, if either of inputs 208, 218 are selected. In other implementations, only audio for the particular character or personality may be muted. For example, a scene that includes Sheriff Bob and Bad Guy Bill may only be muted by the video customization service when Sheriff Bob speaks.

Inputs 210, 220 may be configured to control whether the video customization service is to fast forward through portions of a video that contain the personality or character associated with preferences screen 200, respectively. In one example, assume that the video customization service buffers a portion of a video before providing the portion to an electronic display. The video customization service may analyze the buffered portion to detect the personality or character in the portion of the video (e.g., using image recognition). If the personality or character is detected in the portion of the video, the video customization service may increase the playback speed of the portion of the video when the portion is provided to an electronic display. In non-limiting examples, the video customization service may double or triple the playback speed of the portion of the video containing the personality or character. The video customization service may mute the corresponding audio of the fast-forwarded portion or may also speed up the corresponding audio while the portion is being fast-forwarded.

Inputs 212, 222 may be configured to control whether the video customization service is to change the channel when the video from the current channel contains the personality or character, respectively. In various implementations, a channel may be a broadcast television channel, a cable television channel, a satellite television channel, or a streamed internet video channel. For example, the video customization service may receive a multiplexed video feed from a cable television provider and provide one of the channels in the feed to an electronic display. If the video customization service detects an image of the personality or character in the channel being provided to the display, the service may change the provided channel to another channel being received by the service. For example, if input 212 is set and John Doe is detected in the video from Channel 45, the video customization service may begin providing Channel 46 to the electronic display, instead. In some implementations, the video customization service may change the channel to a previously-visited channel, such as the last visited channel. In other implementations, preferences screen 200 or another similar screen may be configured to allow a user to specify the new channel (e.g., the channel to be monitored), if the personality or character is detected. For example, preferences screen 200 may include one or more inputs configured to allow a user to specify that the video customization service is to change the channel to a particular channel, if the personality or character is detected on the current channel.

Inputs 214, 224 may be configured to control whether the video customization service is to skip to the portions of a video that contain the personality or character, respectively. In some cases, a user may wish to emphasize portions of a video that contain the personality or character. Similar to the other video customization options, the service may analyze a buffered portion of a video to detect the presence of the personality or character in the portion. If the personality or character is detected in the portion of the video, the video customization service may provide the portion of the video to an electronic display normally. However, if the video customization service does not detect the presence of the personality or character in the portion of the video, the service may not provide that portion to the electronic display. In some implementations, the portion of the video may be only the images in the video that contain the personality or character. In other implementations, the portion of the video may be a pre-indexed portion of the video, such as a scene or chapter of a movie or recorded television program (e.g., the scene may be played by the service, even if the scene has images that do not contain the character or personality). In one example, assume that a user of preferences screen 200 only wishes to watch scenes of a movie that include Sheriff Bob and uses input 224. In such a case, only scenes of the movie that include Sheriff Bob may be provided by the video customization service to electronic display 100.

In some implementations, preferences screen 200 may include inputs 226, 228 configured to control whether the video customization service provides alerts when the personality or character is detected, respectively. In various implementations, the video customization service may perform image analysis on video from one or more undisplayed sources to detect the presence of the personality or character. For example, the video customization service may analyze a different channel not currently being provided to the electronic display. If the character or personality is detected in video on the other channel, the video customization service may provide an alert to the display. In some implementations, preferences screen 200 or another similar screen may be configured to allow a user to specify the channel or channels to be monitored. For example, a user may specify that they wish to monitor Channel 45 for appearances of Sheriff Bob.

According to some implementations, the video customization service may utilize voice commands in addition to, or in lieu of, preferences screen 200. For example, a user may issue a voice command to the video customization service, "Skip scenes with John Doe." In response, the video customization service may set the corresponding preference, either on preferences screen 200 or off-screen.

Figure 3:
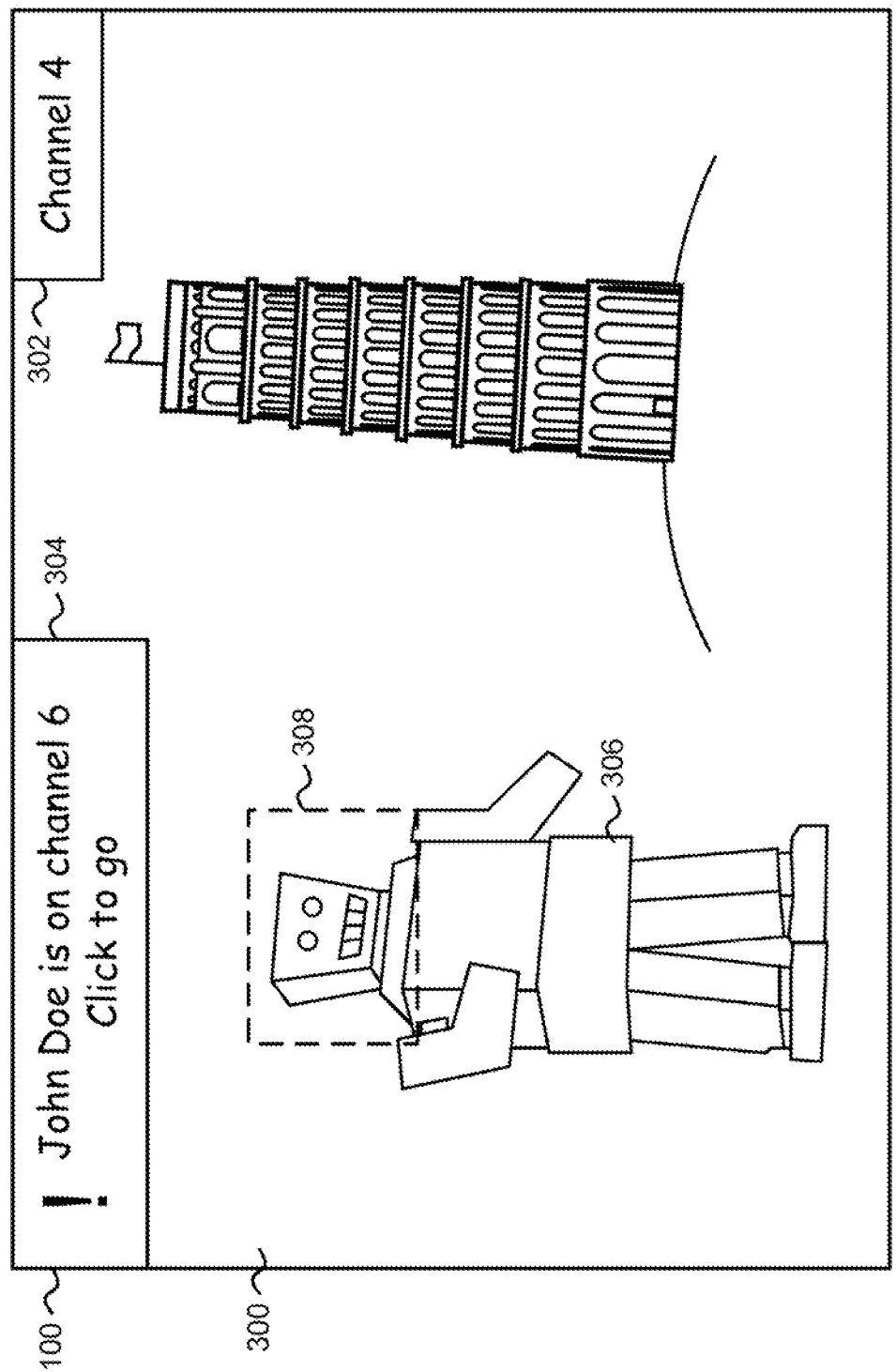
FIG. 3 is an example illustration of an alert being provided to an electronic display.

Referring now to FIG. 3, an illustration of an alert being provided to an electronic display 100 is shown, according to various implementations. In the example shown, a user may currently be watching a video 300. Video 300 may be provided to electronic display 100 via a channel, such as Channel 4 indicated by icon 302. For example, assume that the channel is a television channel, such as an over-the-air broadcast, cable, or satellite television channel.

In the example shown, assume that one or more preferences have been set for the video customization service to monitor other channels for the personality, John Doe. For example, input 226 of preferences screen 200 in FIG. 2 may be set by a user. In response, the video customization service may monitor one or more channels that are not being provided to electronic display 100 (e.g., channels other than Channel 4). For example, the video customization service may perform image recognition on the video on Channel 6 to detect the presence of John Doe. In response to detecting John Doe in the video on the other channel, the video customization service may provide an alert 304 to electronic display 100.

In some implementations, alert 304 may be selectable by a user interface device. When alert 304 is selected by a user input device, the video customization service may switch from video 300 to the video available on the corresponding channel. For example, selection of alert 304 may cause video 300 to be replaced on electronic display 100 with the video from "channel 6."

In cases in which the video being played on electronic display 100 is a recorded video (e.g., a streamed video, a DVD, a video recorded by a digital video recorder, etc.), the video customization service may scan n-number of minutes ahead of real-time (e.g., the current point in time of the video being played) to detect the presence of the character or personality. If the personality or character is detected, the video customization service may generate an alert that indicates when the personality or character is to appear. For example, an alert may indicate that Sheriff Bob is to appear in the video in five minutes. In some implementations, the alert may include the ability to skip to the portion of the video that contains the personality or character. For example, the user may be presented with the option to skip five minutes ahead to the portion of the video that contains Sheriff Bob. If the recorded video contains advertisements, the video customization service may be configured to skip the advertisements or not skip advertisements, according to various implementations.

The video customization service may be configured to provide a guide to electronic display 100 that lists when each detected personality or character appears in a video. For example, the guide may list that Sheriff Bob appears in scenes 3, 4, and 5 of the video and that Bad Guy Bill appears in scenes 1, 2, and 5 of the video. Such a guide may be configured to allow a user to skip to the scenes or other portions of the video that contain the character or personality. In some implementations, the guide may list the most frequently shown characters or personalities in the video. For example, the guide may list the top five most shown characters in the video and allow a user to skip to those portions containing one of the characters. In other implementations, the guide may only display characters or personalities selected by a user of the video customization service.

Alerts generated by the video customization service may be of any number of different types. Non-limiting examples of an alert that may be generated include an audible sound (e.g., a beep, a voice notification, etc.) provided to a speaker, a pop-up alert provided to an electronic display (e.g., alert 304, etc.), and an alert provided to a mobile device via a wireless connection (e.g., an email message, a text message, etc.). In some implementations, the type of alert may be set as a preference in the video customization service. For example, a user may specify that she wishes to receive text messages to her mobile phone whenever a particular character or personality is detected.

According to various implementations, the video customization service may monitor a user's actions regarding a video to determine the user's disposition towards displayed characters or personalities. Based on the actions regarding the video, the video customization service may set one or more preferences for the user. Actions may include, but are not limited to, changing the current channel, muting the audio, fast-forwarding the video, rewinding the video, and stopping the video. The video customization service may associate the actions with a detected character or personality in the video and set a corresponding preference for a user. For example, assume that the portion of video 300 being displayed on electronic display 100 includes a character 306, Richard the Robot. The video customization service may analyze facial area 308 in video 300 to identify character 306. If the user always changes the channel when character 306 is displayed, the video customization service may set a preference to change the channel automatically. In another example, the video customization service may determine that a user is fast-forwarding a video to watch a particular character or personality. In such a case, the video customization service may set a preference for the user that emphasizes the character or personality.

In some cases, the video customization service may use timing information to determine whether to set a user preference and which preference to set. Timing information may correspond to the amount of time a user watches a video containing a particular character or personality. For example, a user that watches video containing character 306 for one hour may like character 306 and the video customization service may set a preference that emphasizes character 306. Conversely, if the user quickly changes the channel showing character 306, the video customization service may set a preference to automatically change the channel whenever character 306 is shown. The video customization service may place a greater weighting on actions performed in the middle of a video than at the video's beginning or end. For example, a user may fast-forward through the credits of a movie, without this action being used by the video customization service to set preferences for the user.

In some implementations, the video customization service may ignore certain time periods regarding a video or deemphasize their significance. Generally, the amount of time that a user has watched a particular video may be more or less significant, depending on the circumstances. In some cases, the total amount of time that a user has watched a video may be less significant after a threshold amount of time has passed (e.g., when the user turns off the video, changes the channel, etc., may be arbitrary after a certain amount of time has elapsed). For example, the video customization service may identify a character as being liked by a user, if the user watches a video containing the character for forty five minutes. Actions after this point in time may be less significant and may be ignored. In other cases, the contribution of watching the video after this point in time to the overall determination of the user's disposition may decrease.

The video customization service may analyze user actions in relation to one another, to automatically set a user preference or suggest an action preference to a user. For example, assume that a user changes the channel ten times within the span of forty five seconds. In such a case, the video customization service may ignore these actions, since the user is likely channel surfing. Conversely, actions that are intermittent and related to a particular character or actor may be used by the service to set a user parameter. For example, a preference may be set by the video customization service if a user tends to watch television shows for ten or more minutes each, but changes the channel whenever a particular character is shown.

The video customization service may aggregate actions regarding a character or personality from multiple users or devices, to maintain popularity ratings for the characters or personalities. Users may, in one implementation, consent to allowing the video customization service to aggregate data regarding the users' viewing habits. For example, character 306 may receive a low rating if users consistently change the channel whenever character 306 is shown. In some implementations, a popularity rating may be associated with user information from the users, if the users have consented to providing this information. For example, character 306 may be favorable to females between the ages of 18-29, but disliked by males in the same age group. If a user is not logged into a user profile, the video customization service may analyze the viewing patterns of the user to estimate the user's characteristics.

In some implementations, the video customization service may provide certain user information and popularity ratings to an advertising system. The advertising system may use the received data to select when certain advertisements are to be presented to users. For example, an advertiser wishing to reach females between the ages of 18-29 may provide an advertisement during video 300, if character 306 has a high popularity rating among certain users. The video customization may also determine which advertisements are watched to completion, which characters or personalities are within the advertisements, and which portions of the users responded positively to the advertisements.

Figure 4:
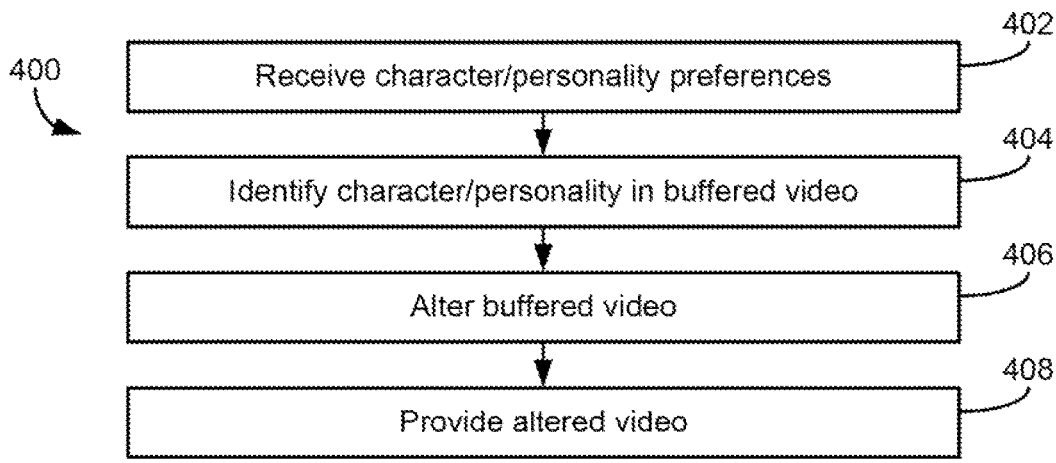
FIG. 4 is a flow diagram of a process for customizing video, according to various implementations.

Referring now to FIG. 4, a flow diagram of a process 400 for customizing video is shown, according to various implementations. Process 400 may be implemented by a video customization service. Such a service may be provided by one or more processing circuits configured to store and execute machine instructions. For example, process 400 may be implemented by a smart television, a set-top box for a television, a video game console, an online server, a mobile device, combinations thereof, or other forms of electronic devices configured to implement a video customization service.

Process 400 includes receiving one or more preferences for a character or personality. In general, a personality may be any person or animal that exists in the real world. For example, a personality may be a real-world actor, celebrity, newscaster, athlete, etc. A character, in contrast, may be a character played by a personality or may be an artificially-created character within a video. A character in a video may or may not appear the same as its corresponding personality. For example, a particular actor may wear a costume while appearing in the video.

A preference may control which action is performed by the video customization service when its corresponding character or personality is detected in a video. In various implementations, a preference may control whether the video customization service is to fast-forward the video, skip over a scene containing the character or personality, skip to the scene containing the character or personality, change the channel showing the video, or mute the dialog of the video. A preference may be set globally (e.g., for all videos) or on a per-video basis (e.g., for a particular movie, television show, video stream, etc.), in various implementations.

A preference may be associated with a particular user profile or device. For example, a user may create a profile with the video customization service and set one or more preferences. The user profile may be associated with any number of electronic devices (e.g., the user's television, set-top box, mobile device, etc.). If the user is logged into his or her profile in the device, the video customization service may use the preference to control which actions are performed regarding video. In other implementations, a preference may be associated directly with an electronic device. For example, a preference may be set for a smart television having a video customization service and used regardless of the person watching the television.

Process 400 includes identifying the character or personality in a buffered video (block 404). In various implementations, the video customization service may load a portion of a video into a buffer, prior to presenting the video to an electronic display. For example, the video customization service may load the next five minutes of a video into the buffer, while the video is playing. The character or personality may be identified in the portion of the video using image or facial recognition on the images in the portion of the video. In some implementations, the video customization service may search a local or remote database of images to identify the character or personality. For example, the service may compare an image in the video to an index of images of celebrities. In some implementations, a user may upload an image of a person which may be used by the video customization service to identify the person in the portion of the video.

In further implementations, a character or personality may be identified by comparing a time in the video to a database that cross-references play times in a video and the characters or personalities that appear at the various times in the video. For example, a pre-existing database may include a listing of all playback times in a movie in which Sheriff Bob appears. Such a database may be queried and the current playback time of the movie compared to those in the database, to determine whether the current scene contains Sheriff Bob.

Process 400 includes altering the buffered video in response to detecting the character or personality (block 406). If the character or personality is detected in the portion of the video, the video customization service may perform the action associated with the preference for that character or personality. For example, the service may fast-forward the portion of the video, skip over the portion of the video, skip to the portion of the video, or mute audio for the portion of the video. In another example, the video customization service may alter the buffered video by replacing the buffered video with video from another source, such as another channel (e.g., the video customization service may change the channel).

Process 400 includes providing the altered video (block 408). In some implementations, the video customization service may provide the altered video directly to an electronic display. For example, a smart television that includes a video customization service may provide the altered video to the display. In other implementations, the altered video may be provided to another device having an electronic display. For example, if the video customization service resides on one or more remote servers, the altered video may be provided to a set-top box, mobile device, etc., that presents the video an associated display.

Figure 5:
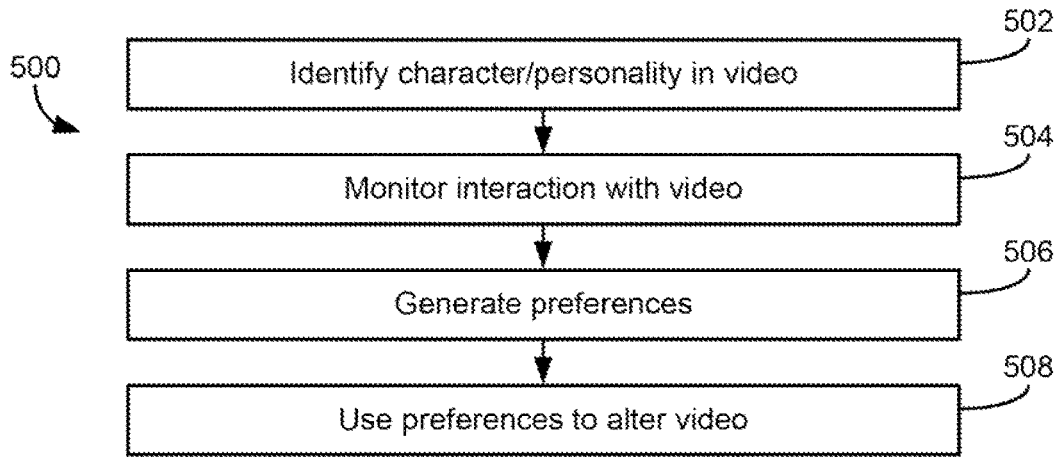
FIG. 5 is a flow diagram of a process for automatically identifying preferences in a video customization service, according to various implementations.

Referring now to FIG. 5, a flow diagram of a process 500 for customizing video is shown, according to various implementations. Similar to process 400, process 500 may be implemented by provided by one or more processing circuits configured to store and execute machine instructions. Process 500 may be implemented as part of the same video customization service that implements process 400 or another service that provides generated preferences to the video customization service.

Process 500 includes identifying a character or personality in a video (block 502). In various implementations, image or facial recognition may be performed on a buffered portion of a video to identify a character or personality. For example, an image of a character or personality in a buffered portion of a video may be compared to a known image of the character or personality. Other techniques that may be used to identify the character or personality include voice recognition of words spoken by the character or personality in the video, and querying a database cataloging when the character or personality appears within the video.

Process 500 includes monitoring interactions with the video (block 504). Interactions with the video may correspond to actions requested by a user while watching the video via an interface device. Such actions may include, but are not limited to, playing the video, pausing the video, stopping the video, changing the channel, muting the audio of the video, fast-forwarding a portion of the video, rewinding a portion of the video, and skipping portions of the video. An action may be associated with the identified character or personality in the video. For example, a user may change the channel when a particular character is being displayed. In some implementations, interactions with the video may be monitored if a user has opted in to allowing the system to monitor his or her actions. For example, a user may set a preference to turn on the monitoring feature, to have the system automatically identify preferences for the user.

Data regarding an interaction with the video may also include timestamp data (e.g., data regarding when the interaction occurred). In other words, the data regarding an interaction may indicate how long the video was played before the interaction occurred and at what point in the video the interaction occurred. For example, the data may indicate that a user changed the channel after watching a television program for five minutes.

Process 500 includes generating one or more preferences using the video interaction data (block 506). A preference may be associated with the identified character or personality and used by a video customization service to customize future videos for a user. In some implementations, the types of interactions and/or when the interactions occurred may be ranked, to determine which preference is set. For example, assume that a user changed the channel twice when a particular character was displayed and muted the volume six times when the character was displayed. An action may receive a weighting based in part on the number of its occurrences regarding the identified character or personality. The weighting may also be based in part on the type of action (e.g., certain actions may be weighted higher than others). In some cases, the weighting may be based in part on when the action occurred. For example, actions that occurred in the middle of a video may receive higher weightings than actions that occurred at the beginning or end of the video. A weighting may also be based in part on other related actions. For example, an channel-changing action regarding an identified personality or character may be ignored (e.g., receive a zero weighting), if other channel-changing actions are also identified within a short period of time (e.g., the user is channel surfing). A parameter corresponding to the highest weighted action may then be generated for the user's profile or device.

Process 500 includes using the one or more generated preferences to alter a video (block 508). In some implementations, a preference may be generated by a video customization service configured to monitor video interactions. In other implementations, a generated preference may be provided to a video customization service. The video customization service may alter a portion of a video, such as a buffered portion of a video, according to the generated preference. For example, a preference may be generated to fast-forward a portion of a video that includes the identified character or personality. In such a case, the video customization service may increase the playback speed of a portion of a video in which the character or personality is detected.

Figure 6:
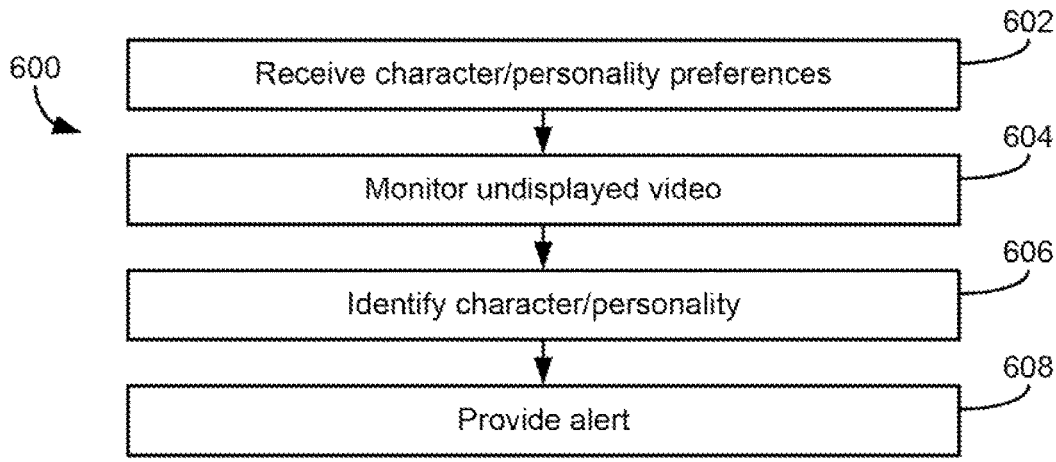
FIG. 6 is a flow diagram of a process for providing an alert, according to various implementations.

Referring now to FIG. 6, a flow diagram of a process 600 for providing an alert is shown, according to various implementations. In general, video from one or more sources may be analyzed to detect the presence of a particular character or personality. For example, a video customization service may be configured to identify characters or personalities within videos from different sources (e.g., different channels, different video players, different network locations, etc.). If a specified character or personality is detected, the service may provide an alert to a user to notify the user that the character or personality is in an available video or will be available in an upcoming portion of a video.

Process 600 includes receiving one or more preferences associated with a personality or character (block 602). The preferences may control whether the service is to monitor video for the personality or character, which sources are to be monitored (e.g., a particular channel, website, video player, etc), and the type of alert to be generated. In various implementations, an alert may be provided in a pop-up window or icon to an electronic display, as an audio alert to a speaker, as an email or similar form of text-based message, or combinations thereof. For example, a user may set a preference to be shown a popup message whenever a particular character is on an available channel.

Process 600 includes monitoring an undisplayed video (block 604). An undisplayed video generally refers to any video or portion of a video that is not currently being provided to an electronic display of a user. For example, an undisplayed video may be video from a different channel or device than the one being displayed. In another example, an undisplayed video may be a portion of a video that has not yet been played (e.g., an upcoming scene of a movie or television show). In some implementations, a portion of the undisplayed video may be stored in a memory, such as a buffer. The memory may be monitored to detect the presence of the character or personality associated with a received preference. For example, the next five minutes of a movie may be analyzed to detect whether the character or personality is in that portion of the movie.

Process 600 includes identifying the character or personality in the undisplayed video (block 606). According to various implementations, the character or personality may be identified using image recognition, voice recognition, or a database index that cross-lists play times with characters or personalities. For example, image recognition may be used on images in an undisplayed channel or in an upcoming portion of a video. In cases in which the character or personality is in an upcoming portion of a video, the scene or times in which the character or personality to appear may also be identified. For example, the next scene in a playing movie may contain the character Sheriff Bob. In such a case, the service may identify the scene itself, the play time at which the character appears (e.g., at play time 45 m:13 s), or the amount of time until the character will be displayed (e.g., Sheriff Bob will appear on screen in three minutes).

Process 600 includes providing an alert regarding the character or personality (block 608). In various implementations, the alert may be generated in response to the character or personality in the undisplayed video being identified. For example, the next n-number of minutes of a playing video may be analyzed and an alert generated when the character or personality is detected. In another example, video from an undisplayed channel may be analyzed and an alert generated when the character or personality is detected. The generated alert may specify when the portion of the video containing the character or personality will be available to watch. For example, the alert may specify that the character or personality is currently being shown on an undisplayed channel or from another video source, or that the character will appear in a currently played video in five minutes.

An alert may be of any type of electronic notification. For example, an alert may be a pop-up window or icon, an audio tone, a text-based message, a graphic, or combinations thereof. In some implementations, the type of alert generated may be based on a set preference (e.g., a user may set a preference to receive a text message to their mobile device when the character or personality is going to be shown). In other cases, a particular type of alert may be set as a default or hard-coded in the video customization service (e.g., the type of alert cannot be changed by a user). In some implementations, the alert may be configured to allow a user to select to be redirected to the undisplayed video. For example, selection of a pop-up alert on an electronic display may cause the channel to be changed or the current video to be advanced to the portion containing the character or personality. In further implementations, a video may be advanced or a video source may be changed automatically (e.g., without further input from a user).

Figure 7:
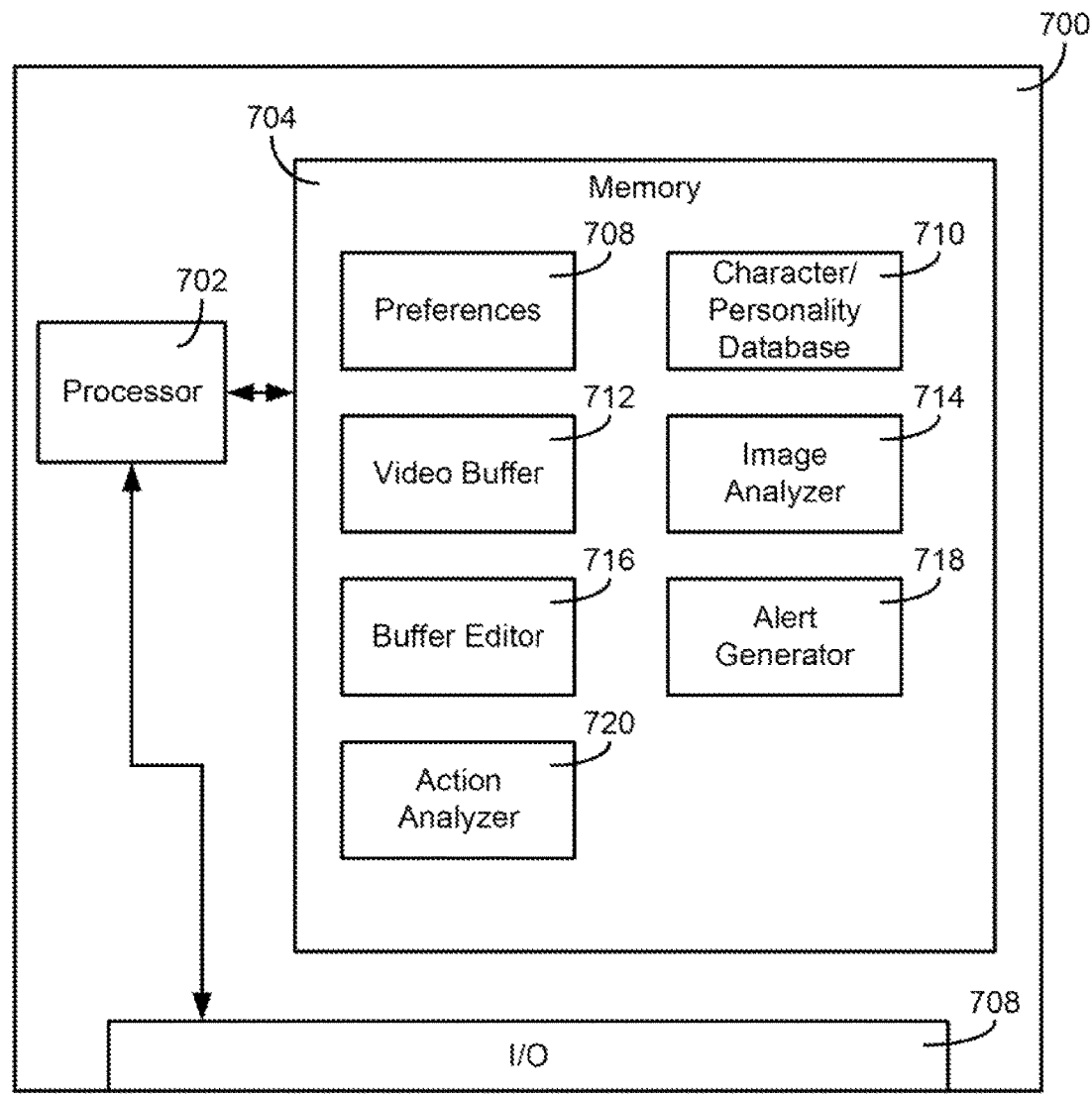
FIG. 7 is a block diagram of a processing circuit configured to customize video, according to various implementations.

Referring to FIG. 7, a detailed block diagram of processing circuit 700 is shown, according to various implementations. In general, processing circuit 700 is configured to provide a video customization service. Processing circuit 700 may be a component of a consumer electronic device (e.g., a smart television, a set-top box, a game console, a mobile device, a personal computer, etc.) or may be a component of server in communication with such a consumer electronic device.

As shown, processing circuit 700 includes processor 702 and memory 704. Processor 702 may be or include one or more microprocessors, an application specific integrated circuit (ASIC), a circuit containing one or more processing components, a group of distributed processing components, circuitry for supporting a microprocessor, or other hardware configured for processing data. Processor 702 is also configured to execute computer code stored in memory 704 to complete and facilitate the activities described herein. Memory 704 can be any volatile or non-volatile computer-readable storage medium capable of storing data or computer code relating to the activities described herein. For example, memory 704 is shown to include an image analyzer 714, a buffer editor 716, an alert generator 718, and an action analyzer 720, which may be implemented using computer code (e.g., executable code, object code, source code, script code, machine code, etc.) configured for execution by processor 702. When executed by processor 702, processing circuit 700 is configured to complete the activities described herein.

In some implementations, processing circuit 700 may be formed by multiple electronic devices in communication with one another (e.g., servers in a data center, a collection of consumer electronic devices, a distributed computing platform, etc.). In such cases, processor 702 may represent the collective processors of the devices and memory 704 may represent the collective storage media for the devices. For example, image analyzer 714 and alert generator 718 may be executed by separate computing devices that communicate over a network (e.g., the Internet, a wireless network, a local area network, etc.).

Processing circuit 700 also includes communication circuitry for supporting the execution of the computer code image analyzer 714, buffer editor 716, alert generator 718, and action analyzer 720. For example, processing circuit 700 may include input and output (I/O) circuitry 706 to communicate data between processing circuit 700 and other electronic devices. For example, I/O circuitry 706 may include hardware for communicating with other electronic devices via a network, such as a local area network (LAN) or the Internet. In further implementations, I/O circuitry 706 may communicate data between processing circuit 700 and one or more user interface devices. For example, I/O circuitry 706 may provide display data to an electronic display or may receive data from a touch-screen display, a pointing device, or a keypad. I/O circuitry 706 may include hardware configured to communicate data wirelessly or via a hardwired connection. For example, I/O circuitry 706 may include hardware to communicate wirelessly via a WiFi, Bluetooth, cellular, or radio connection. In another example, I/O circuitry 706 may include hardware to communicate via a hardwired connection to an electronic display (e.g., via an HDMI cable, an internal serial bus, a USB cable, etc.).

Memory 704 may include preferences 708. Preferences 708 may be received by processing circuit 700 via I/O circuitry 706. For example, preferences 708 may be received from a user interface device or a remote consumer electronic device (e.g., if processing circuit 700 is part of a networked server). Generally, preferences 708 may be any preferences configured to control the operation of the video customization service provided by processing circuit 700. For example, preferences 708 may control which characters or personalities are detected by image analyzer 714 in a video, the action to be performed by buffer editor 716 when image analyzer detects a certain character or personality, whether buffer editor 716 is to perform an action locally (e.g., for a particular show or movie) or globally (e.g., to all videos), the type of alert generated by alert generator 718, and whether action analyzer 720 analyzes a user's interaction with a video, and any other functions performed by processing circuit 700.

In some implementations, preferences 708 may be part of a user's profile in the video customization service. For example, preferences 708 may be associated with a login, screen name, or other identifier for the user. In some implementations, the user may provide information about the user as part of his or her profile, such as the user's characteristics (e.g., age, gender, etc.). In further implementations, preferences 708 may be associated with one or more consumer electronic devices. For example, preferences 708 may be associated with a particular set-top box, smart television, etc. The one or more electronic devices may or may not be associated with a user's profile. In other words, preferences 708 may be user-specific or device-specific (e.g., preferences that are applied regardless of the user using the device), in various implementations.

Memory 704 may include a character or personality database 710. In some implementations, database 710 may include image and/or audio data associated with a particular character or personality. For example, database 710 may include one or more images of the character or personality that may be used by image analyzer 714 to determine whether the character or personality is present in a portion of a video. In some cases, database 710 may be updated periodically with data received via I/O circuitry 706. For example, database 710 may receive updated regarding the newest movies, television shows, etc. from an update server. In other implementations, database 710 may be a database located remotely from processing circuit 700. For example, database 710 may be a database of characters and/or personalities available to processing circuit 700 via the Internet.

In some implementations, database 710 may be configured to allow a user to modify the contents of database 710. For example, database 710 may be configured to allow a user to associate a character or personality with an uploaded image, an image available via an image-sharing service (e.g., a social networking service or other online image-sharing service), an image available on a removable storage disk, etc. In one example, assume that a user's mother is going to appear on the evening news. The user may create an entry in database 710 for his mother and associate the entry with an uploaded image of his mother. Image analyzer 714 may then compare the uploaded image data to a portion of a video, to detect the presence of the user's mother in the video.

Memory 704 may include video buffer 712. In general, video buffer 712 stores at least a portion of one or more videos. A portion of a video in video buffer 712 may be stored in memory 704 or received via I/O circuitry 706. For example, a portion of a video in video buffer 712 may include video data available on a television channel, a cable channel, a satellite channel, a video stream via a computer network, a playback device (e.g., a DVD player, a BluRay player, or the like), a download source, or stored locally in memory 704. The portion of the video may be the entirety of the video, in some cases. For example, a movie received from a DVD player may be loaded into video buffer 712 in its entirety. In other cases, only a certain portion of the video may be loaded into video buffer 712. For example, video buffer 712 may include ten seconds of video from a cable channel, the next five minutes of a DVD movie, or any other portion of a video.

The one or more videos in video buffer 712 may or may not be provided to an electronic display via I/O circuitry 706. In some cases, a portion of one video in video buffer 712 may be provided to an electronic display, while a portion of another video is not provided to the display (e.g., video buffer 712 may include undisplayed video). For example, video from one channel in video buffer 712 may be provided to the display while video from other channels are not. In another example, a portion of a DVD movie in video buffer 712 may be provided to the electronic display, while portions of streamed video in video buffer 712 are not. In some implementations, the video data provided to an electronic display may be changed to another portion of video in video buffer 712 (e.g., by changing the channel, by selecting a different input source, etc.).

Image analyzer 714 may be configured to use image recognition on a portion of a video in video buffer 712. According to various implementations, image analyzer 714 may compare image data in database 710 to the portion of the video in video buffer 712, to identify a character or personality in the portion of the video. For example, image analyzer 714 may compare a facial area of a character or personality in a portion of a video to facial data stored in database 710. In some implementations, which characters or personalities are detected by image analyzer 714 may be controlled by preferences 708. For example, a user may create an entry in preferences 708 that specifies that image analyzer 714 is to detect the presence of a particular actor in the video data stored in video buffer 712. Image analyzer 714 may also generate timing data regarding a detected character or personality. For example, image analyzer 714 may determine the playback times in a video in which the character or personality appear.

Buffer editor 716 may receive an indication of a detected character or personality from image analyzer 714. For example, buffer editor 716 may receive an indication from image analyzer 714 that a particular character or personality is present in the video data currently being provided to the electronic display. In another example, buffer editor 716 may receive an indication from image analyzer 714 that a particular character or personality is present in undisplayed video data in video buffer 712.

Buffer editor 716 may be configured to perform any number of actions on the video data in video buffer 712. In various implementations, buffer editor 716 may perform an action in response to receiving an indication that a particular character or personality has been detected by image analyzer 714. Non-limiting actions performed by buffer editor 716 may include muting audio associated with the video being provided to a display, fast-forwarding a portion of video that contains the character or personality, skipping over a portion of video that contains the character or personality (e.g., by not providing the portion of video to the display), skipping to a portion of video that contains the character or personality, and changing the provided video data to video data from another source (e.g., from another channel, from another input device, from another video streaming service, etc.). Preferences 708 may be used to control which action, if any, is performed by buffer editor 716. For example, buffer editor 716 may change the channel whenever a particular actor is detected on the current channel and skip over scenes of a movie that contain another actor.

Memory 704 may include alert generator 718 configured to generate an alert and provide the alert via I/O circuitry 706. Similar to buffer editor 716, alert generator 718 may receive an indication of a detected character or personality from image analyzer 714. In response, alert generator 718 may generate and provide an alert as a pop-up icon or screen to an electronic display, a text message to a mobile device, an audible alert to a speaker, or any other type of alert that notifies a user that the character or personality has been detected. The type of alert may be controlled by preferences 708, in some implementations. For example, a user may set a preference in preferences 708 to be presented with a pop-up notification generated by alert generator 718 whenever a particular actor appears on an undisplayed channel. In some implementations, alert generator 718 may generate and provide an index of when the character or actor appears in a video. For example, alert generator 718 may provide an index screen to a display that lists all of the appearances of a particular character or actor in a movie.

In some implementations, an alert generated by alert generator 718 may be associated with an action performable by buffer editor 716. For example, a pop-up alert provided to a display by alert generator 718 may notify a user that a particular character or actor is appearing on another channel and include an option to be redirected to that channel. In response to receiving input from a user interface device (e.g., via selection of a pop-up alert, an icon, a button of a remote control, etc.), buffer editor 716 may perform the corresponding action. For example, an alert from alert generator 718 may notify a user that a character will be shown in a movie in five minutes and include an option to advance the movie to this playback time.

Memory 704 may include action analyzer 720 configured to analyze a user's interactions with video provided by processing circuit 700 to a display. In general, action analyzer 720 may be configured to determine a user's disposition towards a particular character or personality that appears in a displayed video. In some implementations, action analyzer 720 may receive an indication from image analyzer 714 that the character or personality has been detected in the video data being provided by processing circuit 700 to an electronic display. Action analyzer 720 may then associate any detected interactions with the video with the character or personality. For example, action analyzer 720 may determine that a user has changed the channel, fast-forwarded the video, skipped to another scene in the video, muted the audio, or performed other such actions. Action analyzer 720 may analyze a user's interactions with videos automatically or based in part on one or more preferences in preferences 708. For example, a user may set a preference in preferences 708 to turn on the learning features of action analyzer 720.

Action analyzer 720 may use detected actions associated with a character or personality to generate a preference in preferences 708. For example, if a user always changes the channel whenever a particular political pundit appears on screen, action analyzer 720 may set a preference in preferences 708 to automatically change the channel whenever the pundit appears on screen. In some implementations, action analyzer 720 may ignore certain actions based on when the actions were performed. For example, action analyzer 720 may ignore actions performed after the video data is presented for a threshold amount of time (e.g., action analyzer 720 may ignore actions performed after a television channel is shown for more than one hour). Similarly, action analyzer 720 may ignore actions performed within the first n-number of seconds of a video. In some implementations, action analyzer 720 may emphasize or deemphasize an action based on its frequency in relation to other performed actions. For example, action analyzer 720 may ignore a changed channel, if the user changes multiple channels within a short amount of time (e.g., the user is channel surfing). In another example, a user skipping a scene in a movie may be emphasized, if the user never skips movie scenes.

According to some implementations, action analyzer 720 may suggest a preference to a user, prior to setting a preference in preferences 708. For example, action analyzer 720 may provide a notification to an electronic display that suggests a preference to a user (e.g., a preference that causes processing circuit 700 to change the channel automatically whenever a particular character or personality appears on screen). In some cases, the notification may include an option to set the preference. If the user selects the option, action analyzer 720 may set the preference. In other cases, the notification may simply be a notification and the user may opt to set the suggested preference manually.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The term "client or "server" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product embodied on a tangible medium or packaged into multiple such software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for presenting media content, the method comprising:
    causing a first portion of video to be presented on a display;
    generating user preferences by:
        determining an entity that a viewer is not interested in based on a user playback action of a plurality of user playback actions that is received on a user device associated with the display during presentation of the entity;
        determining a skip action to be performed in association with a character based on the user playback action, wherein the skip action causes a portion of the video to be skipped in response to detecting the entity; and
        associating the entity with the skip action;
    identifying, using a hardware processor, the entity in a second portion of video while the first portion of video is being presented, wherein the second portion of video is stored in a buffer associated with the display;
    identifying a duration of time until the entity is to be presented in the second portion of the video; and
    causing an alert that indicates the entity has been identified in the second portion of video to be presented and performing the skip action in response to identifying the entity in the second portion of the video, wherein the alert identifies the entity in the second portion of the video and the duration of time until the entity is to be presented in the second portion of the video.

2. The method of claim 1, wherein the entity is a character that the viewer is not interested in based on the user playback action detected when the character is being presented in the video.

3. The method of claim 2, wherein the character in the second portion of video is detected using facial recognition.

4. The method of claim 1, further comprising:
    in response to determining that the alert has been selected, causing the second portion of video to be skipped from being presented on the display.

5. A method for presenting media content, the method comprising:
    causing a first portion of video to be presented on a display;
    generating user preferences by:
        determining an entity that a viewer is not interested in based on a user playback action of a plurality of user playback actions that is received on a user device associated with the display during presentation of the entity;
        determining a skip action to be performed in association with a character based on the user playback action, wherein the skip action causes a portion of the video to be skipped in response to detecting the entity; and
        associating the entity with the skip action;
    identifying, using a hardware processor, the entity in a second portion of video while the first portion of video is being presented, wherein the second portion of video is stored in a buffer associated with the display; and
    causing an alert to be presented on a user device other than the display that indicates the entity has been identified in the second portion of video.

6. A method for presenting media content, the method comprising:

causing a first portion of video to be presented on a display, wherein the first portion of video is associated with a first channel;
generating user preferences by:
    determining an entity that a viewer is not interested in based on a user playback action of a plurality of user playback actions that is received on a user device associated with the display during presentation of the entity;
    determining a skip action to be performed in association with a character based on the user playback action, wherein the skip action causes a portion of the video to be skipped in response to detecting the entity; and
    associating the entity with the skip action;
identifying, using a hardware processor, the entity in a second portion of video while the first portion of video is being presented, wherein the second portion of video is stored in a buffer associated with the display, and wherein the second portion of video is associated with a second channel; and
causing an alert to be presented that identifies the entity in the second portion of the video and at least one of the first channel and the second channel.

7. A system for presenting media content, the system comprising:
a memory; and
a hardware processor that, when executing computer-executable instructions stored in the memory, is configured to:
    cause a first portion of video to be presented on a display;
    generate user preferences by:
        determining an entity that a viewer is not interested in based on a user playback action of a plurality of user playback actions that is received on a user device associated with the display during presentation of the entity;
        determining a skip action to be performed in association with a character based on the user playback action, wherein the skip action causes a portion of the video to be skipped in response to detecting the entity; and
        associating the entity with the skip action;
    identify the entity in a second portion of video while the first portion of video is being presented, wherein the second portion of video is stored in a buffer associated with the display;
    identify a duration of time until the entity is to be presented in the second portion of the video; and
    cause an alert that indicates the entity has been identified in the second portion of video to be presented and perform the skip action in response to identifying the entity in the second portion of the video, wherein the alert identifies the entity in the second portion of the video and the duration of time until the entity is to be presented in the second portion of the video.

8. The system of claim 7, wherein the entity is a character that the viewer is not interested in based on the user playback action detected when the character is being presented in the video.

9. The system of claim 8, wherein the character in the second portion of video is detected using facial recognition.

10. The system of claim 7, wherein the hardware processor is further configured to:
    in response to determining that the alert has been selected, cause the second portion of video to be skipped from being presented on the display.

11. The system of claim 10, wherein the alert is presented on a user device other than the display.

12. The system of claim 7, wherein the first portion of video is associated with a first channel, and wherein the second portion of video is associated with a second channel, and wherein the method further comprises causing an alert to be presented that identifies the entity in the second portion of the video and at least one of the first channel and the second channel.

13. A non-transitory computer-readable medium containing computer executable instructions that, when executed by a processor, cause the processor to perform a method for presenting media content, the method comprising:
    causing a first portion of video to be presented on a display;
    generating user preferences by:
        determining an entity that a viewer is not interested in based on a user playback action of a plurality of user playback actions that is received on a user device associated with the display during presentation of the entity;
        determining a skip action to be performed in association with a character based on the user playback action, wherein the skip action causes a portion of the video to be skipped in response to detecting the entity; and
        associating the entity with the skip action;
    identifying the entity in a second portion of video while the first portion of video is being presented, wherein the second portion of video is stored in a buffer associated with the display;
    identifying a duration of time until the entity is to be presented in the second portion of the video; and
    causing an alert that indicates the entity has been identified in the second portion of video to be presented and performing the skip action in response to identifying the entity in the second portion of the video, wherein the alert identifies the entity in the second portion of the video and the duration of time until the entity is to be presented in the second portion of the video.

14. The non-transitory computer-readable medium of claim 13, wherein the entity is a character that the viewer is not interested in based on the user playback action detected when the character is being presented in the video.

15. The non-transitory computer-readable medium of claim 14, wherein the character in the second portion of video is detected using facial recognition.

16. The non-transitory computer-readable medium of claim 13, wherein the method further comprises:
    in response to determining that the alert has been selected, causing the second portion of video to be skipped from being presented on the display.

17. The non-transitory computer-readable medium of claim 16, wherein the alert is presented on a user device other than the display.

18. The non-transitory computer-readable medium of claim 13, wherein the first portion of video is associated with a first channel, and wherein the second portion of video is associated with a second channel, and wherein the method further comprises causing an alert to be presented that identifies the entity in the second portion of the video and at least one of the first channel and the second channel.

* * * * *